July 16, 1929.   R. H. BOWEN   1,721,066
PULLEY
Filed May 29, 1926    2 Sheets-Sheet 1
FIG. I.
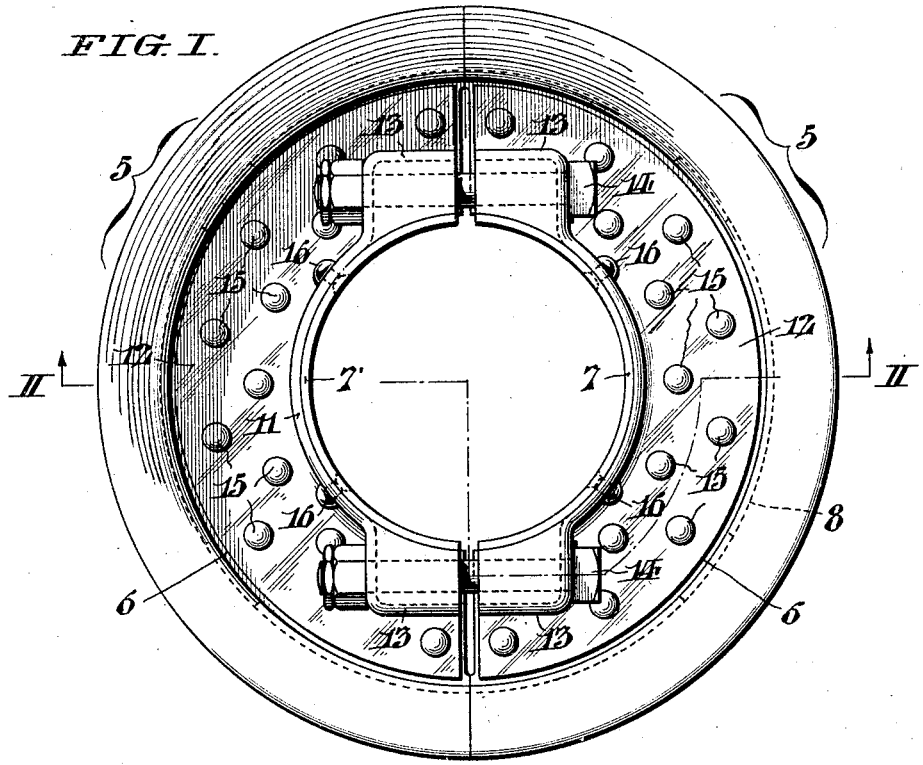
FIG. II.
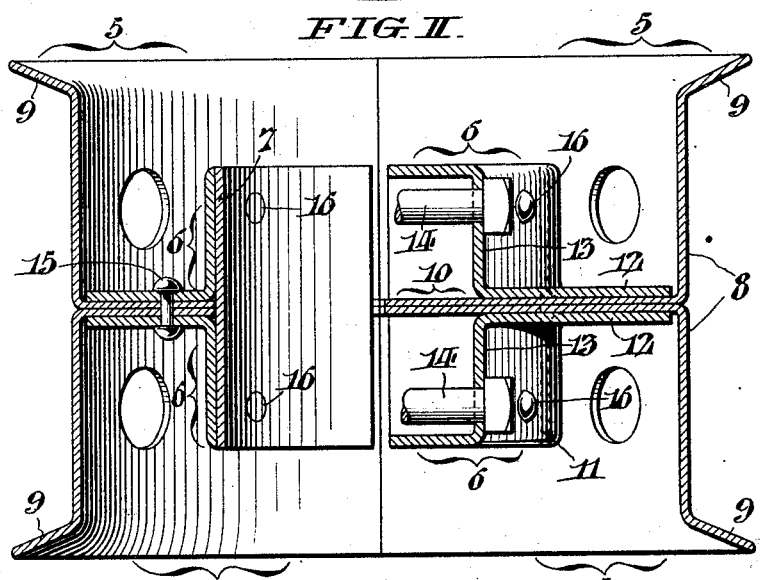
WITNESSES
John C. Bergner
Belford H. Neff
INVENTOR:
Russell H. Bowen,
BY Fraley Paul
ATTORNEYS.

July 16, 1929.  R. H. BOWEN  1,721,066
PULLEY
Filed May 29, 1926  2 Sheets-Sheet 2
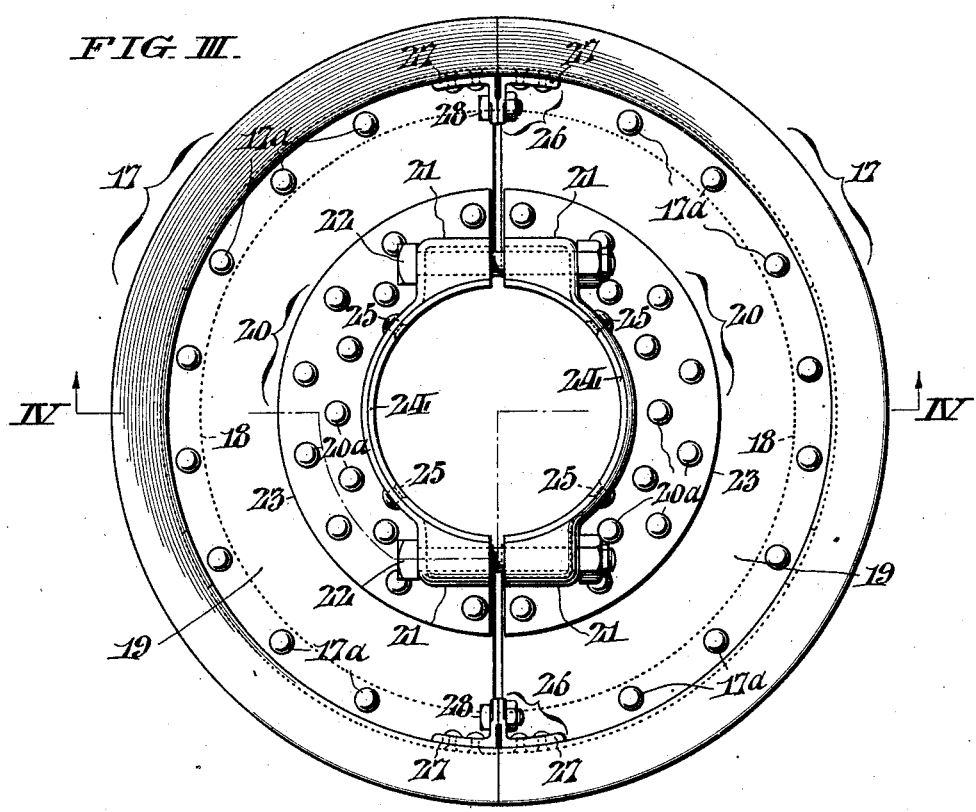
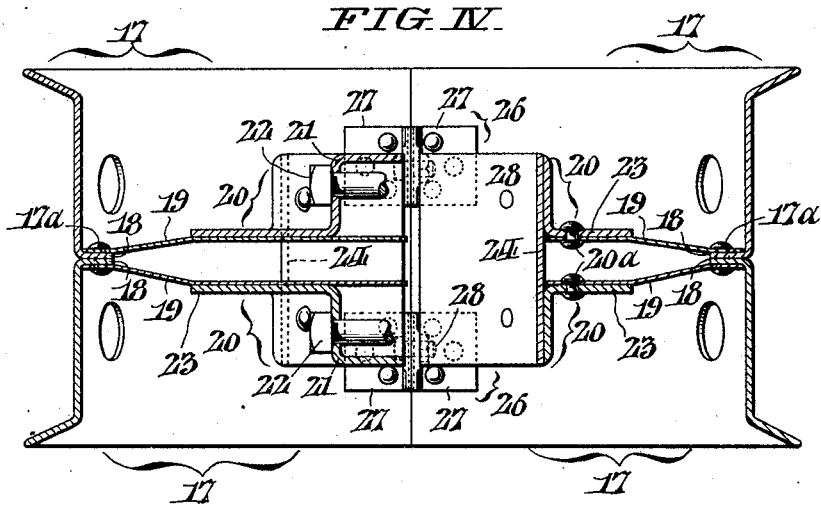
WITNESSES
John C. Bergner
Belford H. Neff
INVENTOR:
Russell H. Bowen,
BY Fraley Paul
ATTORNEYS.

Patented July 16, 1929.

1,721,066

UNITED STATES PATENT OFFICE.

RUSSELL H. BOWEN, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

PULLEY.

Application filed May 29, 1926. Serial No. 112,533.

This invention relates to pulleys, more particularly to pulleys constructed of sheet metal and of a type adapted to be used on truck axles of railroad cars for belt driving of lighting generators.

The objects of my invention are to enable construction of pulleys of the type referred to of component parts of a minimum number and kind capable of being assembled with the utmost ease and rapidity; and, in general, to attain the advantages of lightness and economy characteristic of sheet metal construction without sacrifice of the required strength and ruggedness necessary to withstand hard usage in continued service.

In the drawings, Fig. I is a face view of a pulley conveniently embodying my invention.

Fig. II is a staggered sectional view of the same taken as indicated by the arrowed line II—II in Fig. I.

Fig. III is a view similar to Fig. I showing an alternative form of my invention; and Fig. IV is a sectional view taken as indicated by the arrowed line IV—IV in Fig. III.

With reference first to the form of pulley shown in Figs. I and II, it will be observed that the same is of the split variety, and made up of identical pairs of component semi-circular parts or elements respectively designated 5—5, 6—6 and 7—7,—all capable of being readily fashioned from sheet metal by die-stamping. The parts 5—5, which may be conveniently referred to as the rim components, jointly provide the pulley tread 8 with outwardly projecting perimetric end guard flanges 9—9 for retainment of a driving belt, and a medial sustaining web 10 of double thickness. The components 6—6 jointly constitute the hub 11 with circumferential flanges 12—12 for abutment against the outer sides of the double web 10 aforesaid, and with opposing lateral shoulder offsets 13 which are pierced for passage of the clamp bolts shown at 14—14. It is to be particularly noted that the circumferential flanges 12—12 of the parts 6—6 are co-extensive in area with the medial web 10 and thus function to effectively reinforce them against lateral thrust. The members 7—7, in turn, together provide the hub sleeve or lining to firmly grip the mounting shaft for the pulley under the clamping action of the bolts 14—14. In manufacture, the halves of the pulley are made up as units, the main parts 5—5 and 6—6 being first assembled in the order and relation shown, and preferably united permanently by symmetrically allocated rivets 15 extending continuously through the flanges 12—12 of the members 6—6 and the double radial web 10. If desired, however, the aforesaid parts may be otherwise secured together as by spot welding for example. With the pulley half otherwise completed as explained, the sleeve section 7 is finally applied to the members 6, 6 and secured by rivets 16 suitably spaced as shown.

The construction of Figs. III and IV is advantageous in pulleys of comparatively larger sizes. Although differing in certain details which will be presently explained, the alternative embodiment is generally similar to the first described organization in that identical pairs of component die-stamped parts of sheet metal are involved in its construction. Here, the rim members designated 17—17, are provided with narrow internal flanges 18—18 which are overlapped at opposite sides by peripheral margins of separate web components 19, 19. These web components 19, 19 are dished or concaved and arranged in opposing relation as shown, thereby to stiffen the structure laterally and render it stronger against axial thrust from opposite directions. The hub members here indicated at 20—20 are formed with offsets 21—21 for the clamp bolts 22—22, as well as with circumferential flanges 23, 23, but these flanges are relatively smaller as compared with those of the previous embodiment and overlap only narrow inner marginal areas of the web components 19—19. As before, the pulley halves may be conveniently made up as units. In this instance however, the web components 19—19 are first assembled with the hub members 20—20 and permanently secured at the regions of overlap preferably by rivets $20^a$, and said web components, with the attached hub members, thereafter joined along their peripheral margins with the rim components 17—17 by rivets $17^a$ passing through the abutted flanges 18—18. Then, lastly, the sleeve or lining members 24—24 are attached by rivets 25 to complete the pulley halves. As an aid to maintain the rim portions of opposite pulley halves aligned along the plane of division between them, I may employ, at these regions, rim clamp devices such as depicted at 26. As shown, these devices each comprise a pair of angle pieces 27—27 which are respectively riveted to the inner rim faces of the two pulley sections contiguous to the line of split and drawn together by screw bolts 28—28.

Having thus described my invention, I claim:

A pulley composed of semi-circular halves, and comprising pairs of individually integral semi-circular rim pieces, with internal web or flange portions, die-stamped out of relatively light sheet metal, and divided in correspondence with the division of the pulley halves; a hub liner, likewise divided into semi-circular halves; corresponding pairs of individually integral externally flanged hub halves, die-stamped out of relatively heavy sheet metal and internally fitting the mid-portions of the liner halves, but embossed into the form of externally shouldered hollow lugs over the ends of said liner halves; and bolts for clamping the pulley halves together on a shaft extending through said lugs outside the ends of said liner halves.

In testimony whereof, I have hereunto signed my name at Philadelphia, Pennsylvania, this 25th day of May, 1926.

RUSSELL H. BOWEN.